Figures 1, 2:
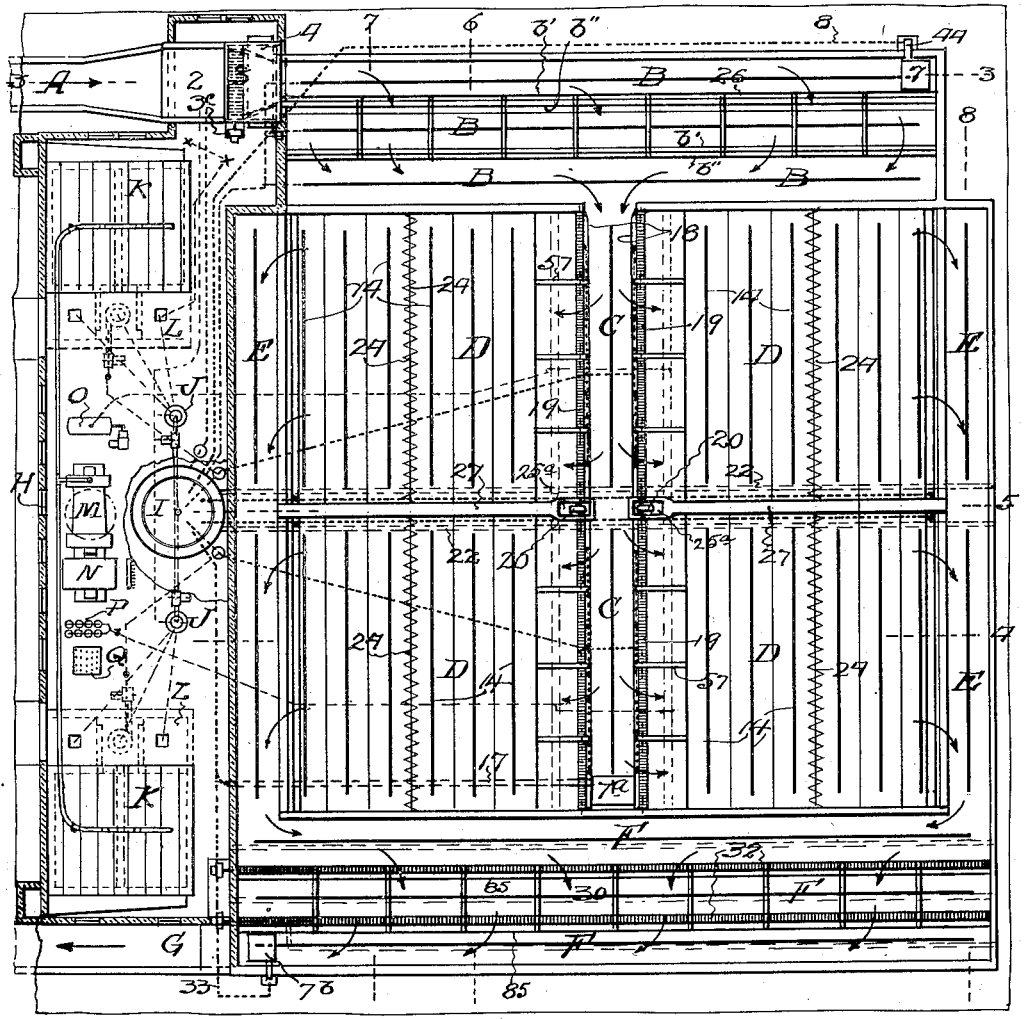

Feb. 7, 1939.  C. G. HAWLEY  2,146,542
SYSTEM OF PURIFICATION AND WASTE RECOVERY
Original Filed Feb. 29, 1932  10 Sheets-Sheet 1

INVENTOR
Charles G. Hawley.
BY
Mason & Mason
ATTORNEYS

Feb. 7, 1939.  C. G. HAWLEY  2,146,542
SYSTEM OF PURIFICATION AND WASTE RECOVERY
Original Filed Feb. 29, 1932  10 Sheets-Sheet 2
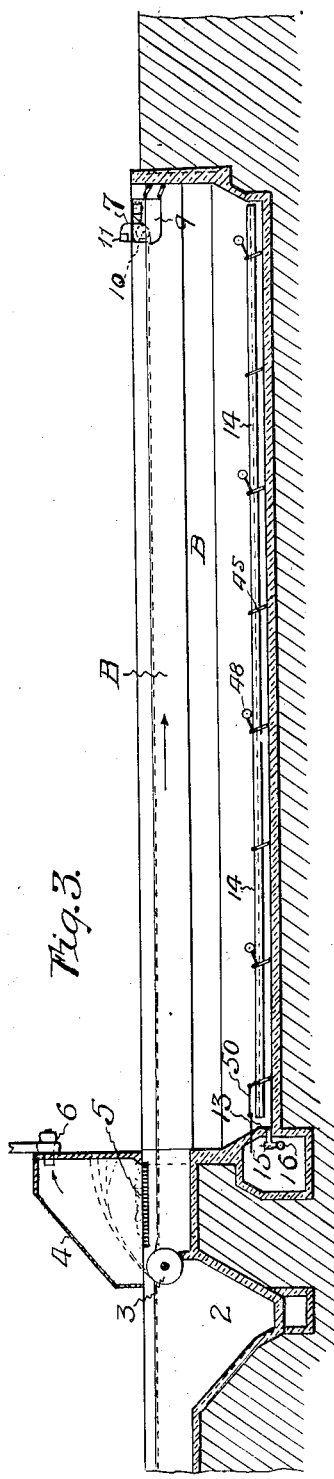
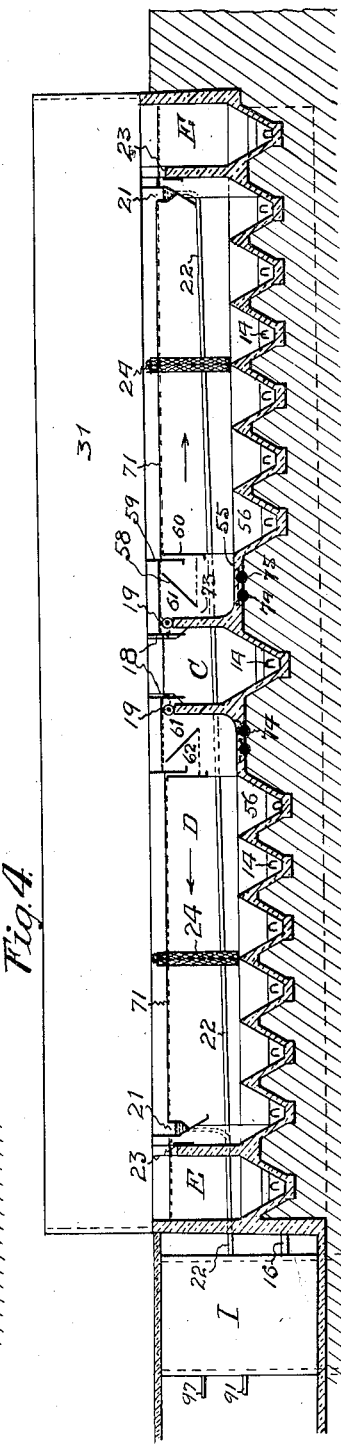
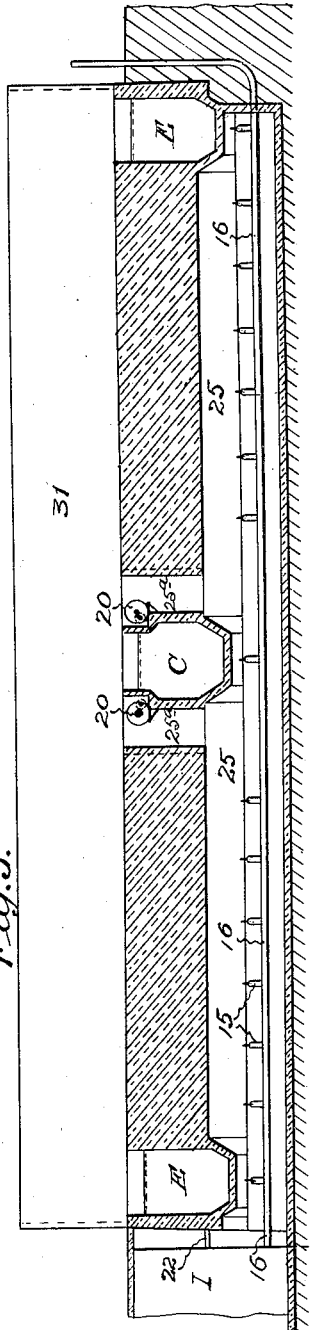
INVENTOR
Charles G. Hawley.
BY Mason & Mason
ATTORNEYS Feb. 7, 1939. C. G. HAWLEY 2,146,542
SYSTEM OF PURIFICATION AND WASTE RECOVERY
Original Filed Feb. 29, 1932 10 Sheets-Sheet 3
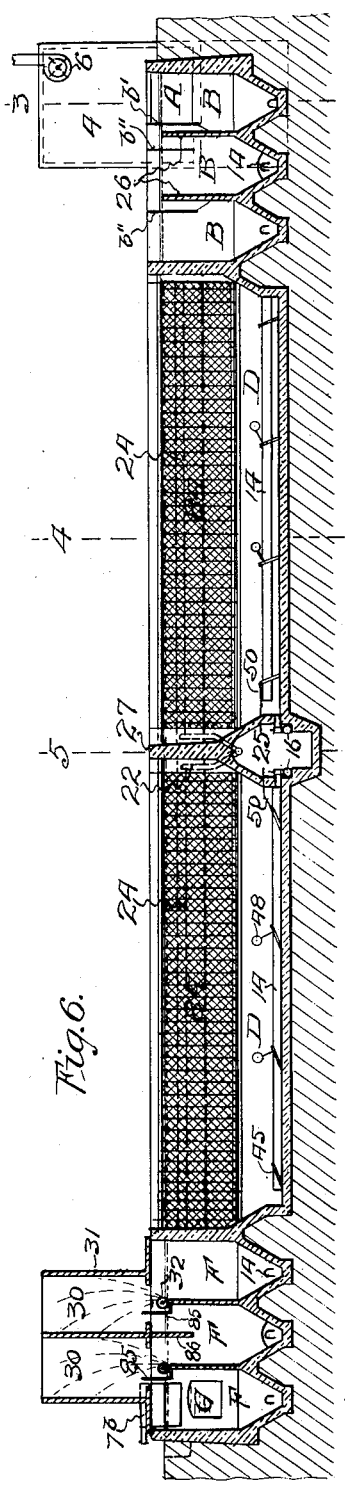
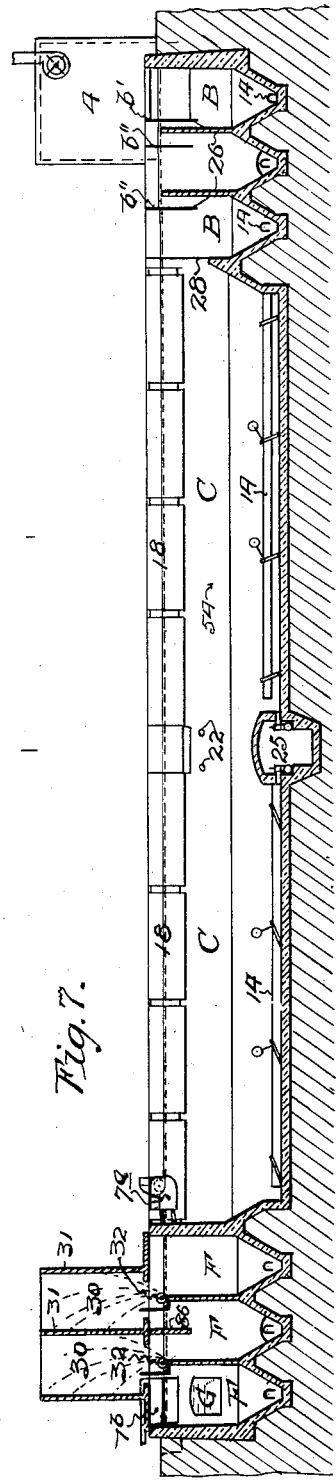
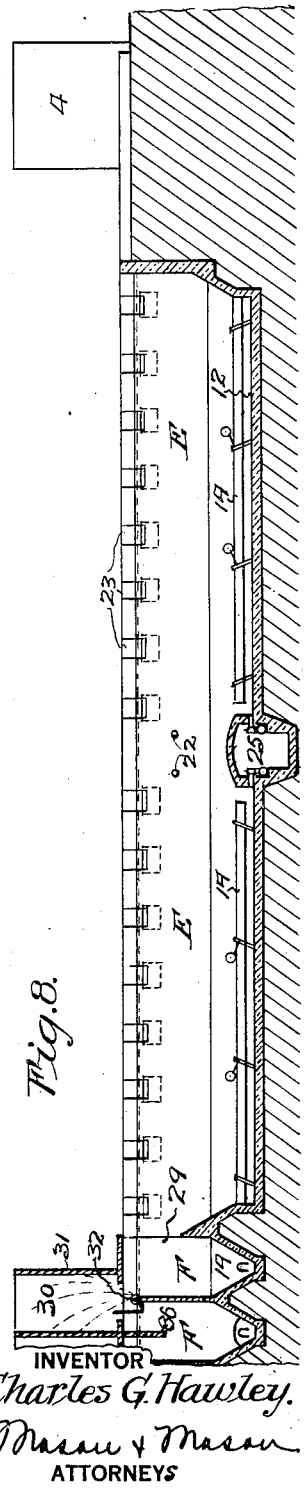
INVENTOR
Charles G. Hawley.
BY Mason & Mason
ATTORNEYS Feb. 7, 1939.   C. G. HAWLEY   2,146,542
SYSTEM OF PURIFICATION AND WASTE RECOVERY
Original Filed Feb. 29, 1932   10 Sheets-Sheet 4
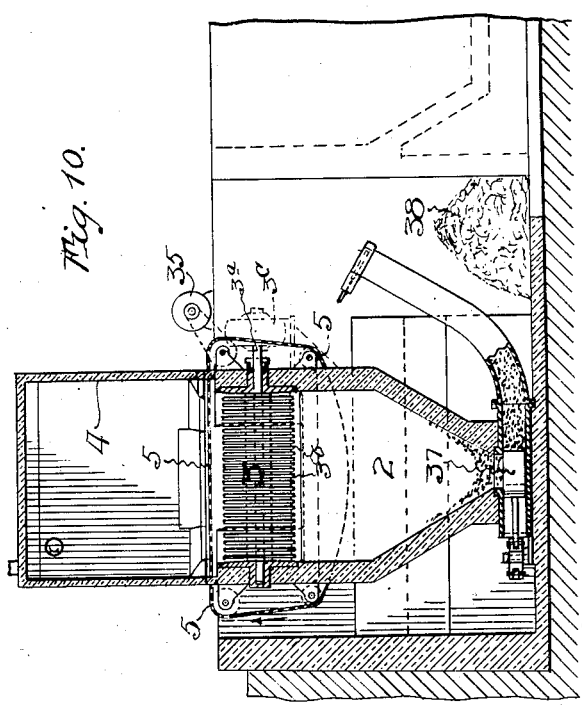
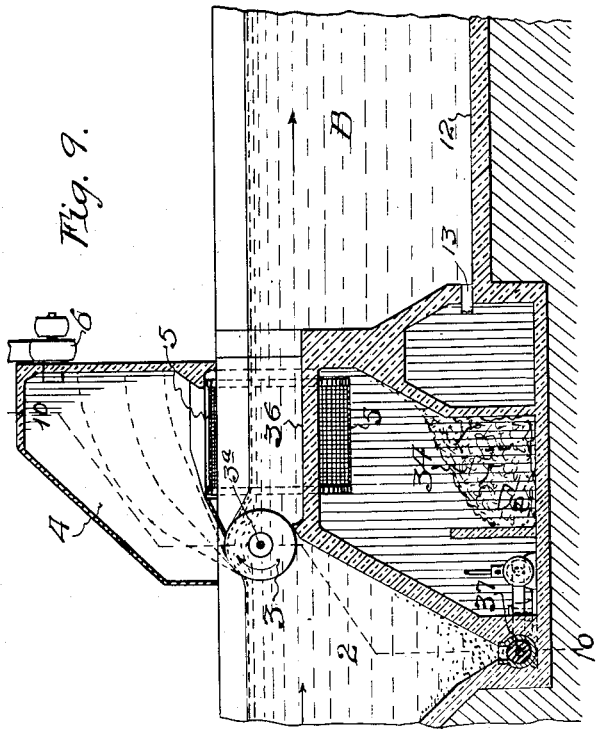
INVENTOR
Charles G. Hawley.
BY Mason & Mason
ATTORNEYS

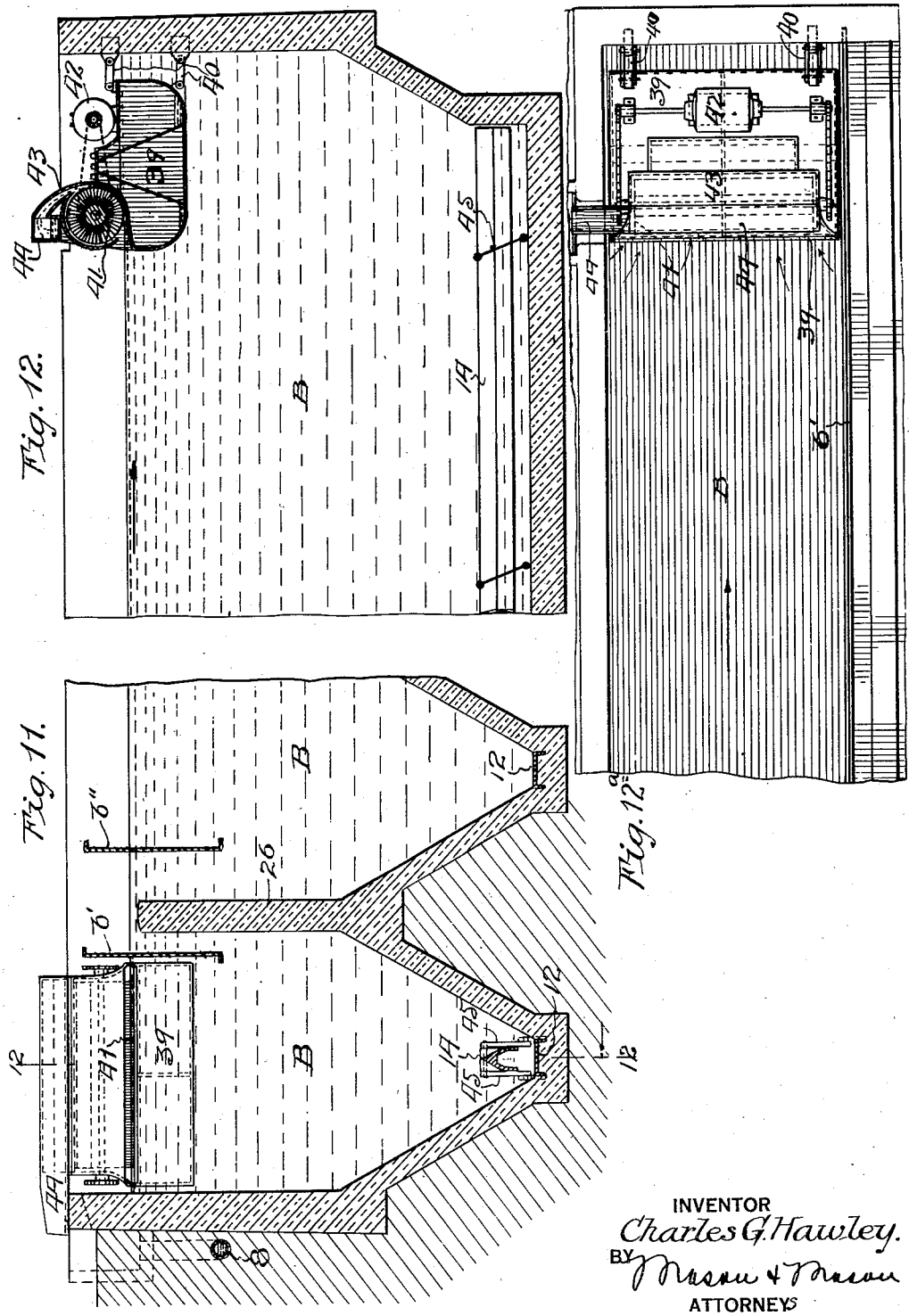

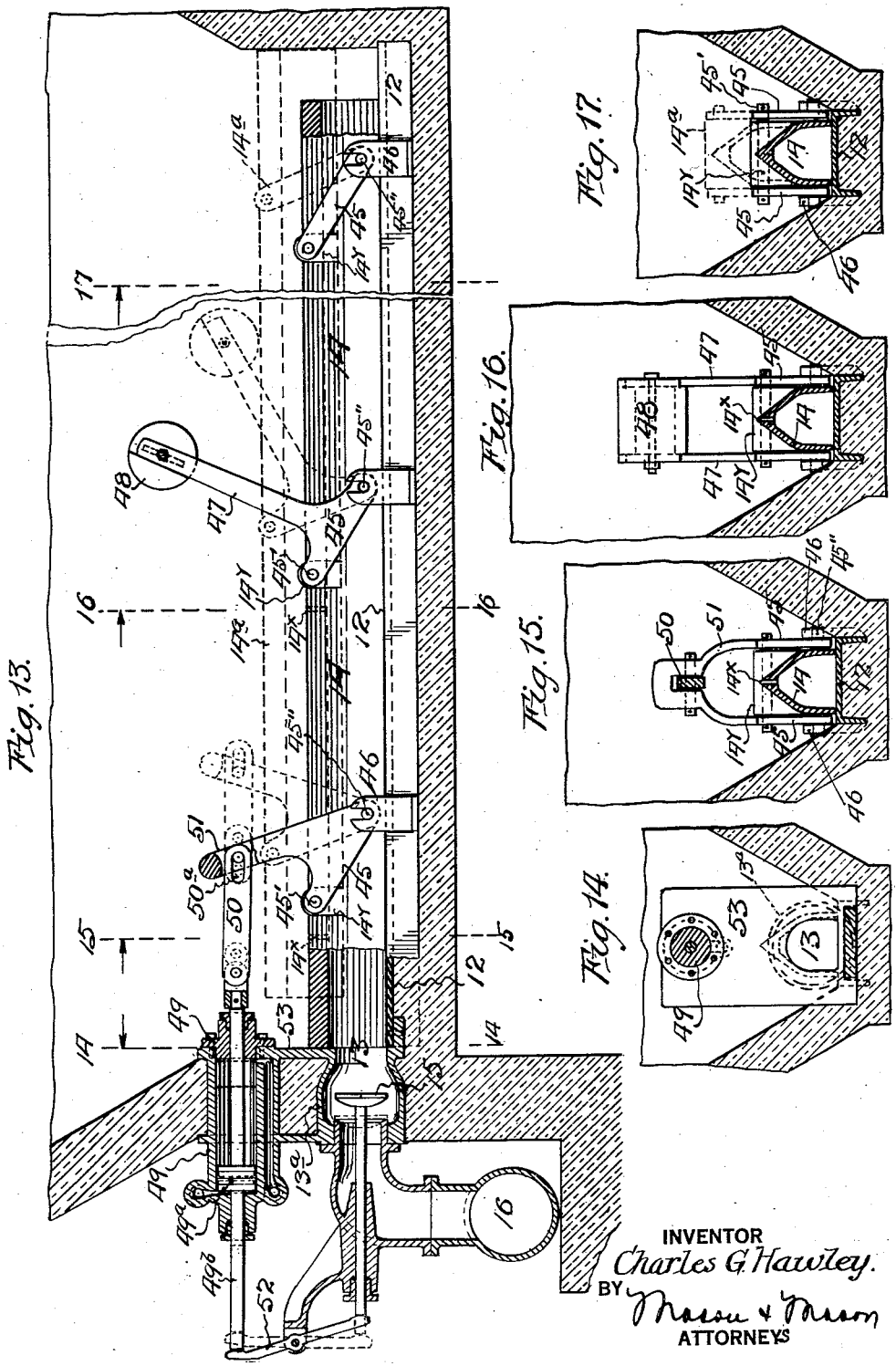

Feb. 7, 1939.  C. G. HAWLEY  2,146,542
SYSTEM OF PURIFICATION AND WASTE RECOVERY
Original Filed Feb. 29, 1932   10 Sheets-Sheet 7
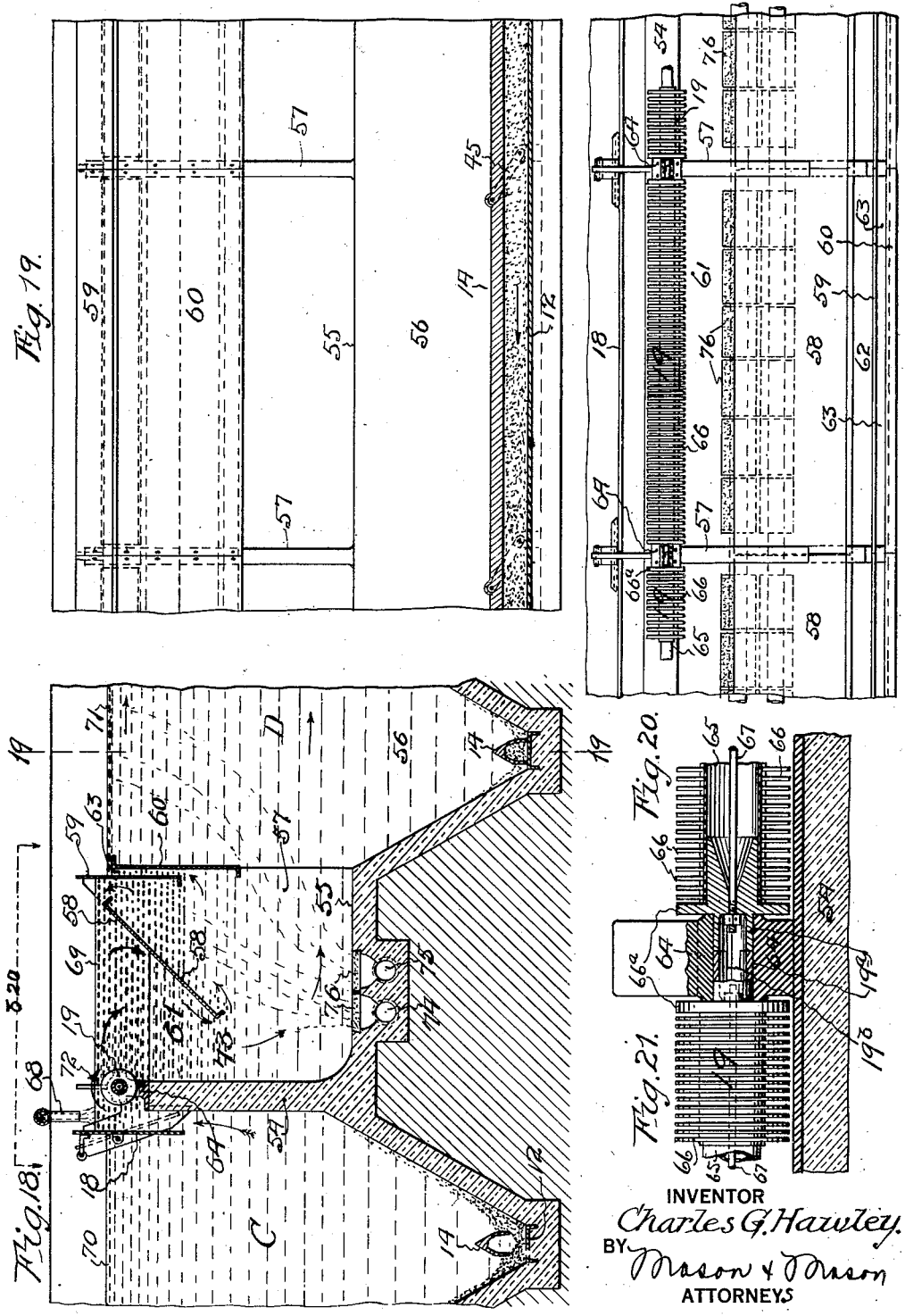

Feb. 7, 1939.  C. G. HAWLEY  2,146,542
SYSTEM OF PURIFICATION AND WASTE RECOVERY
Original Filed Feb. 29, 1932  10 Sheets-Sheet 8
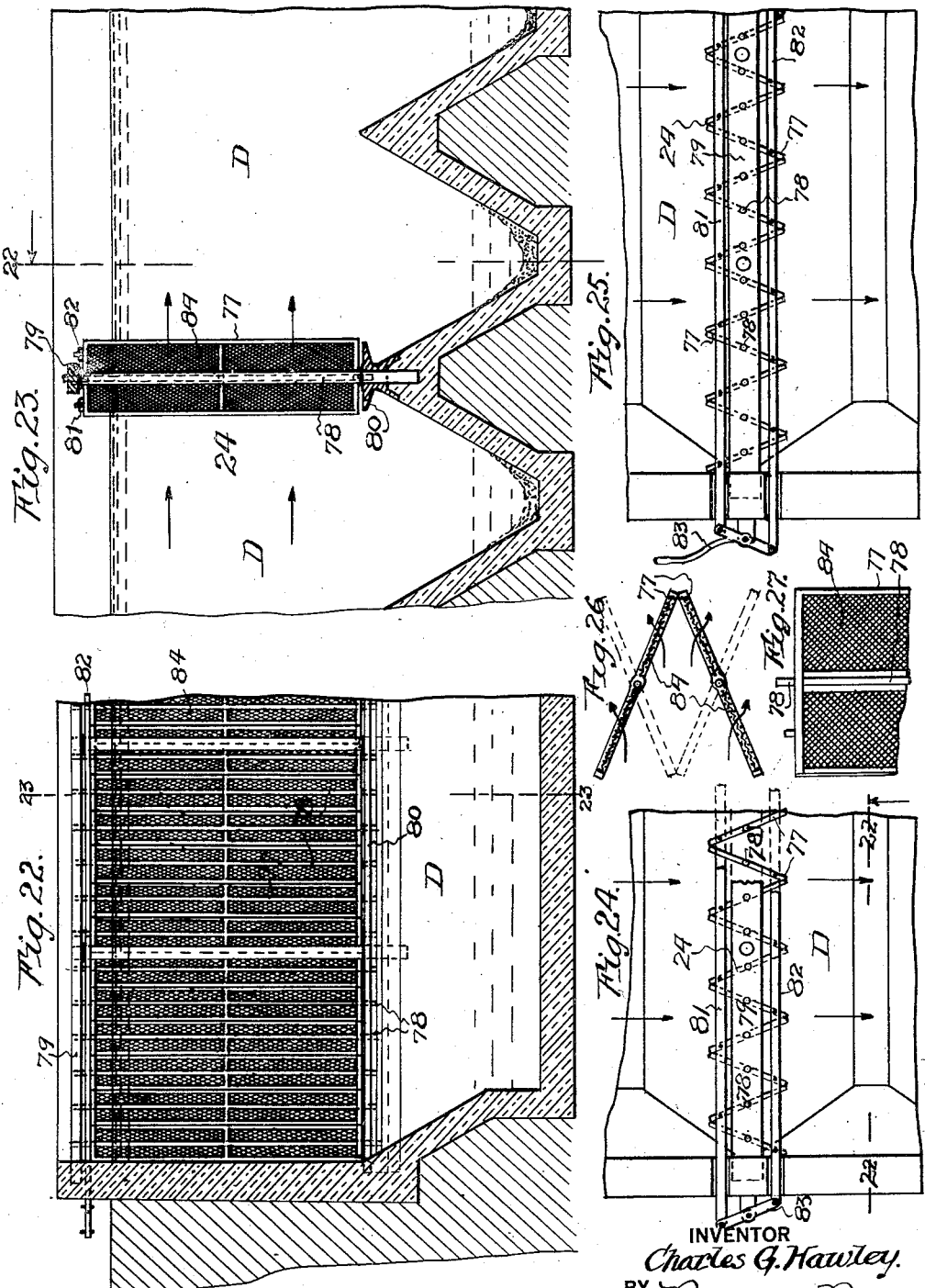
INVENTOR
Charles G. Hawley.
BY
ATTORNEYS

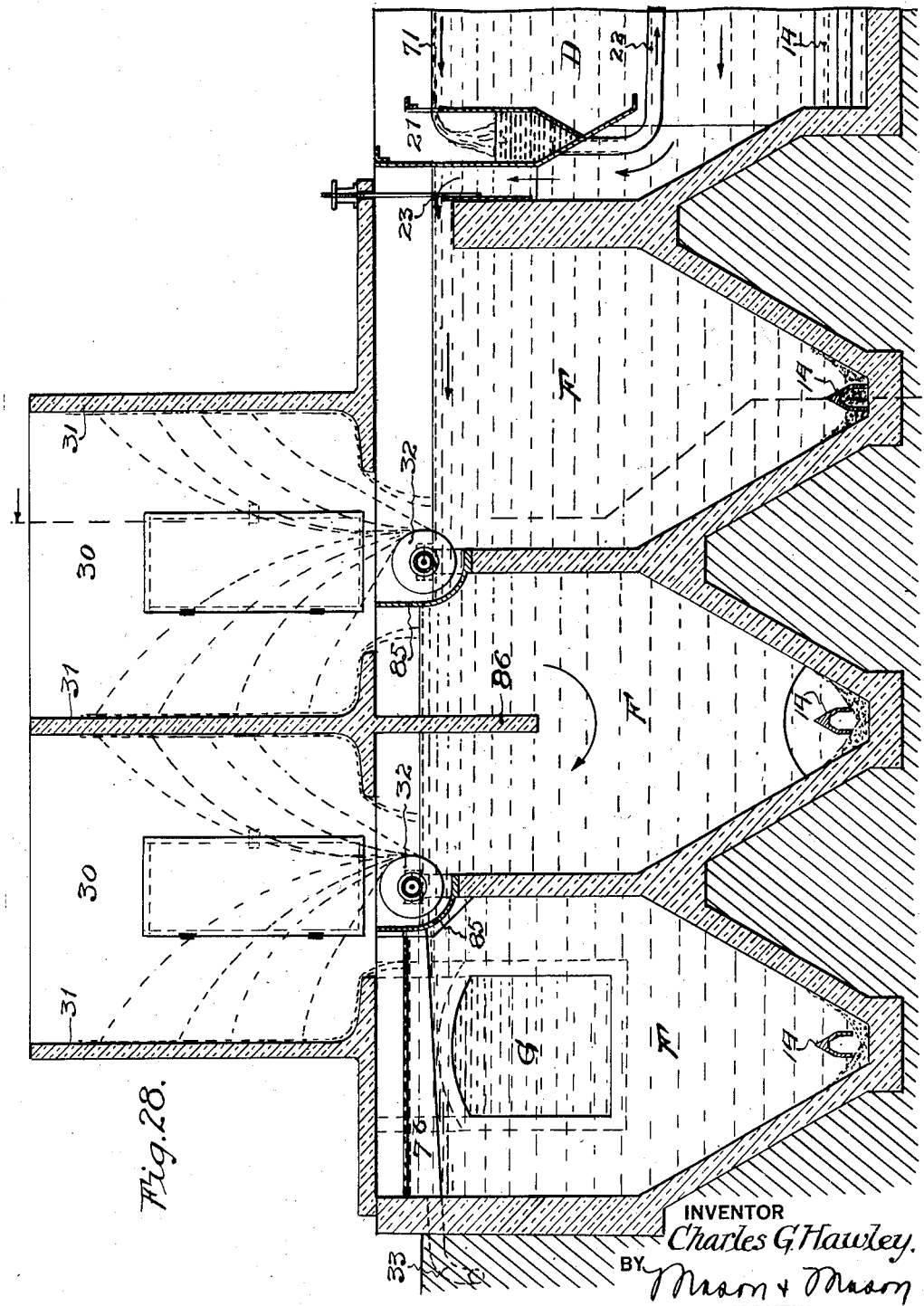

Feb. 7, 1939.  C. G. HAWLEY  2,146,542
SYSTEM OF PURIFICATION AND WASTE RECOVERY
Original Filed Feb. 29, 1932   10 Sheets-Sheet 10

INVENTOR
Charles G. Hawley.
BY Mason & Mason
ATTORNEYS

Patented Feb. 7, 1939

2,146,542

UNITED STATES PATENT OFFICE 2,146,542

SYSTEM OF PURIFICATION AND WASTE RECOVERY

Charles Gilbert Hawley, Chicago, Ill.

Application February 29, 1932, Serial No. 595,868
Renewed July 8, 1938

36 Claims. (Cl. 210—2)

The purpose of the invention described in the following pages is to provide for the complete treatment of sewage at reasonable original cost, at low operating expense, and, with profit.

The system also applies to the purification of water for municipal and industrial consumption. It is applicable to the treatment of many factory products and to liquid wastes generally.

Basing figures upon equivalent performances and actual demonstrations it may be said that this system will occupy not more than one-fourth the area demanded by present systems; that its cost will be correspondingly low and that expenses of operation will be only a fraction of the costs experienced with present systems. Furthermore this present system is capable of and is intended to be operated to yield actual profits.

The system comprises a complete process and plant of novel intent, performance and effect. It is suited to liquid wastes of all kinds and also for original use in conditioning water for municipal and industrial consumption.

Generally the system will be used in its entirety; but several of its novel components are well suited to the older systems, and may be used independently.

All of the elements of the present invention are employed in treating sewage and this specification will be addressed primarily to that subject. Brief mention will then be made of kindred processes and abbreviated forms of the apparatus.

As viewed from sanitary, economic and engineering standpoints, the greatest need for improvement is presented by municipal sewage. It must, in most cases, be purified to an extent that will permit its safe return to the city's original source of water supply. A high degree of water purification is demanded and the problem is complicated by the collection of large quantities of scums and sludges which are of most objectionable character, pronounced treatment being required to render them harmless.

The methods now in vogue require large tracts of land and the expenditure of great sums in and for plant construction, plant equipment and plant operation. First costs are burdensome and every system now in use is conducted at heavy daily expense to taxpayers. The efforts toward sanitation are right but results are erratic and the means employed impose tax burdens far beyond reason.

In contrast and basing estimates upon equal capacities and equivalent purifications, it is calculated that the system here presented will occupy about one-fourth the area and about one-half the depth of present sewage disposal systems. Measured in cubic yards this system approximates one-eighth the size of like present systems. The component parts being of like nature it is evident that the new costs are made to be well within reason.

Present systems require much pumping of sewage, long distance pumping of sewage sludges and also the pumping of great volumes of air. Much power is consumed, expensive machinery required and extensive piping systems involved. This new system minimizes the demands for power, machinery and piping and if desired develops an abundance of power which may be sold or employed for municipal purposes.

Sewage systems now in use are confronted by the task of disposing of the separated matters, retained for long periods and necessitating expensive digestion tanks. Again, large and usually remote areas are required for drying beds on which the sludges may be pumped and where a great amount of work must be done in spreading of the wet sludges and in removing the dried sludges from the beds.

Dryness having been attained, another difficulty is encountered. What can be done with the dried sludge? The proposal that it be used as fertilizer has been strongly negatived for the reason that such fertilizers are not of general utility and are rarely free from objectional bacteria. The sale of fertilizer has been attempted by many sewage plants but never has been successfully consummated; and no one has ever succeeded in selling sewage sludge for more than a fraction of its cost. The same is true of the gases evolved by the digestion of sludges. Their value never equals their cost.

In contrast the system here presented operates to collect the impurities promptly and in minimum volume and then as promptly destroys them by burning them. The effect is to make a plant of given size do the work; indeed, more work, than is now being done by plants of far greater size and cost.

Most partial treatments of sewage are conducted mechanically. Better treatments are afforded by bio-chemical systems. Few systems are of a purely chemical nature.

Little progress has been made in chemical treatment because of the high cost of chemicals and the expense of the equipment required. The sewage solids are increased in weight and must still be eliminated by sedimentation or by filtration, requiring extensive settling tanks and special measures for the disposal of sludges.

The cost of chlorine is now low enough to admit of its use and frequently the chlorination of sewage is desirable. The proposed system makes provision therefor, at little added cost. No other chemical treatment, and no electrical treatment of the sewage, is contemplated.

The large scale bio-chemical systems now operating with best success start with the recognition of the presence of innumerable bacteria and proceed with the idea of increasing the bacterial papulation to the end that the bacteria shall consume or destroy all objectionable matters in the sewage. Over-population and the exhaustion of consumable matters result in self-destruction of bacteria. Thus ultimate famine is depended upon to destroy the bacteria and make the effluent safe. The operation necessitates constant laboratory and plant attendance and every such bio-chemical system, even under expert supervision, is apt to discharge an effluent of highly dangerous character.

In contrast, the sewage system here proposed assumes that all forms of vegetable and animal life are objectionable and begins at once to annihilate all animal and plant growths. Acting from this viewpoint, the process is greatly simplified, for now it is only necessary to accomplish the actual separation of impurities from the water. This system provides for the immediate recovery or removal of all impure substances, and finally, provides for the destruction thereof chiefly by a process of combustion which produces energy that is salable at a profit and an ash also profitably salable. Valuable by-products are also made available.

In brief, the system presented by this invention is designed to accept sewage continuously; to discharge the water in a highly purified state after a brief lapse of time; and, to finally and profitably dispose of the separated matters within the same period of time; avoiding long delays, extensive tankage and much machinery.

Turning now to another phase of the problem:—Sewage disposal systems are not regarded as pleasant neighbors, both the idea and the odors of sewage being abhorrent. In consequence, it is the practice to place such plants at remote points, which practice entails the over-extension of sewers and tunnels. To avoid multiplication of labor, plants are made as large as possible, resulting in excessive cost and unwieldy size.

In contrast, the present invention provides a system which at once destroys odors and renders the operation visually unobjectionable. This system may be placed upon any available ground and because of low initial and operating costs, it now becomes economically feasible to locate any desired number of sewage plants at the points which drainage and sanitary engineers find most convenient.

De-centralization of sewage treatment thus becomes both possible and desirable. The economy of such "decentralization" will be understood when it is realized that long sewers, great holding tanks and the pumping of sewage are thus to be avoided. Again present systems collect the wastes from all sorts of dwellings, mills, factories, hospitals and the like. All sewages go to a common plant, there to be subjected to the same treatment, which obviously must be extended to conform to the worst of the wastes received.

Under the present invention, discrimination is made possible. The differing sections of a municipality may now be provided with individual disposal plants; and the work of such plants may be accommodated to the differing sewages at minimum expense. In this connection, attention is directed to the differing effects of hospital wastes, packing house wastes, mill wastes, and the wastes from sugar plants, starch plants, oil refineries, railway shops and so forth. It is economically wrong to mix such wastes and then undertake a tedious and costly corrective treatment. The proposed system permits the economic segregation of sewage districts and also ensures the economic recovery of many by-products, valuable to the municipality.

Great quantities of chemicals, oils and greases are drained into sewers and under present conditions preclude the prompt and effective treatment of the sewage. Laws and ordinances have been set up in the hope of keeping them out of sewers, for as matters stand they constitute liabilities and both delay and increase the cost of sewage disposal.

In contrast, the present system is not embarrassed by chemicals, oils or greases. Instead, the very substances most objected to by others are here converted into valuable assets and made to become distinct aids. The chemicals received actually aid sedimentation and greases and oils are welcomed by this system; which uses them to advantage in the process of purification and finally provides for their recovery and utilization with profit.

The invention in its entirety and also with respect to its component parts and special constructions will be readily understood upon reference to the accompanying explanatory drawings. The complete system chosen for illustration occupies less than one acre of land and yet has a minimum daily capacity of twenty million gallons of municipal sewage.

Figure 29:
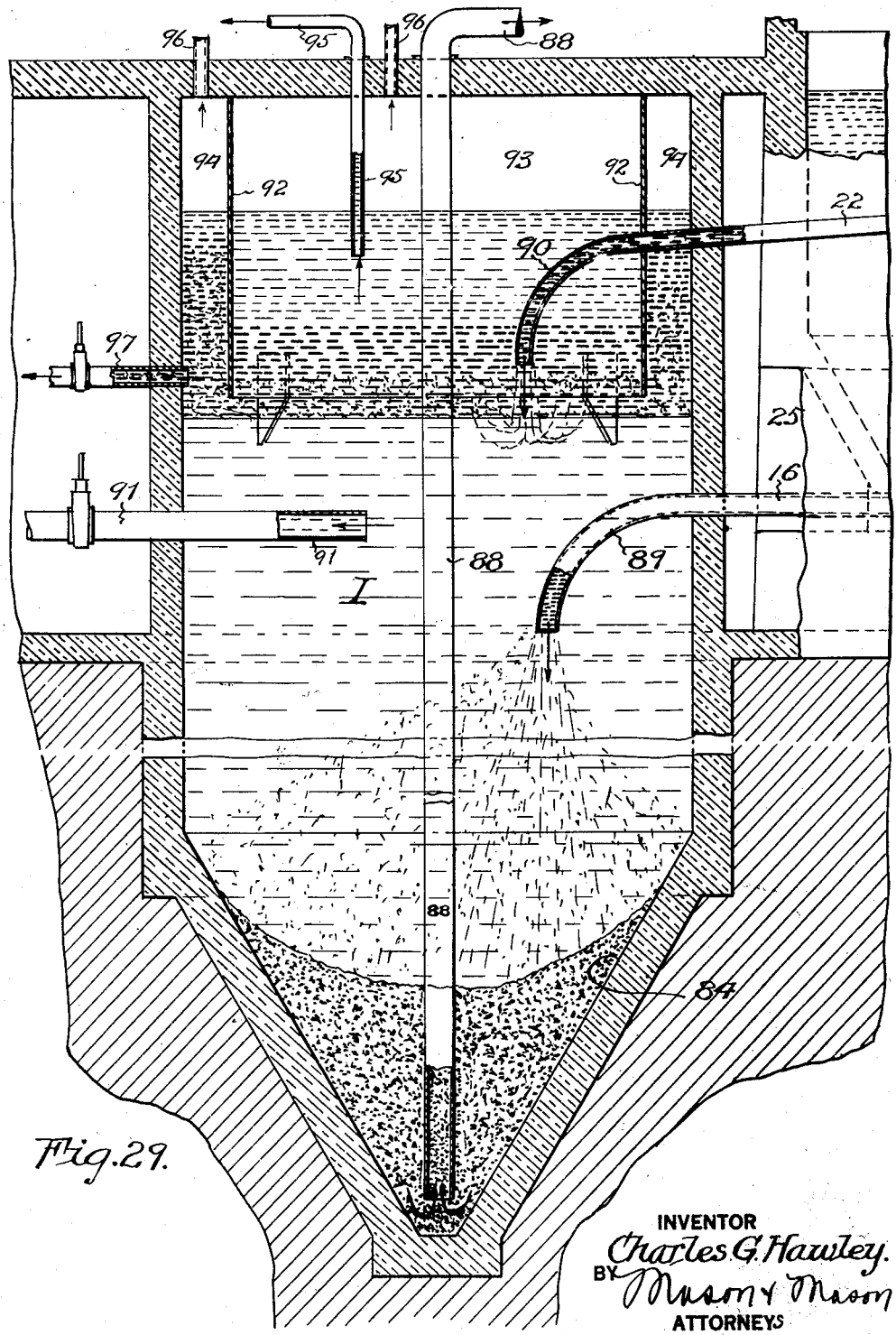

In said drawings Fig. 1 is a plan view of the system, with arrows representing the directions of sewage flow; Fig. 2 is an end elevation partly in section, to show the interior of the power house; Fig. 3 is a vertical section on the line 3—3 of Fig. 1; Fig. 4 is a section on the line 4—4 of Fig. 1; Fig. 5 is a section on the line 5 of Fig. 1; Fig. 6 is a section on the line 6 of Fig. 1; Fig. 7 is a section on the line 7 of Fig. 1; Fig. 8 is a section on the line 8 of Fig. 1; Fig. 9 is an enlarged vertical section corresponding with the section line 3—3 of Fig. 1 and more fully illustrating the automatic grit pocket and screen which are positioned at the entrance of the plant; Fig. 10 is a cross section upon the irregular line 10—10 of Fig. 9; Fig. 11 is an enlarged cross section disclosing the position and construction of one of the floating scum skimmers belonging to the system; Fig. 12 is a longitudinal section on the line 12—12 of Fig. 11; Fig. 12a is a plan view taken from Fig. 12; Fig. 13 is an enlarged longitudinal and vertical section disclosing any one of the trough-like bottom portions of the tank and the sludge discharging mechanism belonging thereto; Fig. 14 is a cross section on the line 14—14 of Fig. 13; Fig. 15 is a cross section on the line 15—15 of Fig. 13; Fig. 16 is a cross section on the line 16—16 of Fig. 13; Fig. 17 is a cross section on the line 17—17 of Fig. 13; Fig. 18 is an enlarged vertical section, as upon the line 4—4 of Fig. 1 and more fully disclosing the use of cooperating oil in the system and also the construction and arrangements of the parts which are positioned between the entrance channel and a slow motion compartment of the system; Fig. 19 is a section on the line 19—19 of Fig. 18; Fig. 20 is a plan view as seen from the bracket b20 of Fig. 18; Fig. 21 is a further enlargement illustrating the construction of the oil-and-water mixing elements, called rotors, which appear in other figures of the drawings; Fig. 22 is an enlarged section, as upon the line 6—6 of Fig. 1 and disclosing the construction and arrangement of the so-called colloiders or colloid collecting elements which are included in the system; Fig. 23 is a section on the line 23—23 of Fig. 22; Figs. 24 and 25 are fragmentary plan views contrasting the two, or reversed, portions of the frames of the colloider; Fig. 26 is a further enlarged horizontal section showing two of the frames with the screens therein; Fig. 27 is an elevation of the upper part of one of the screen frames; Fig. 28 is an enlarged cross section of the finishing compartments of the system; and Fig. 29 is a similarly enlarged vertical section illustrating the construction and operation of the sump or sludge separator, which is an element of this system.

The tank portion of this system is of compact rectangular form and comprises successive trough-like compartments, separated by dividing walls that act as weirs and have the effect of preventing short circuits and ensuring uniformity of flow. Economy of space dictates the arrangement of the preliminary sedimentation compartments B at one end of the plant and of the final conditoning compartments F at the other end thereof. Between them is arranged a group of four slow sedimentation compartments D. The sewage leaves the last preliminary compartment B and enters the compartments D through a trough-like middle channel C. Slowly crossing the compartments D, the well purified sewage passes into respective side troughs E and thence flows to the first of the finishing compartments F, from the last of which the purified sewage departs through the effluent outfall or channel G.

The sludge disposal and power house H is best arranged at one side of the plant and here becomes a power generating plant. It contains a deep sludge sump or separating tank I and the small pumps and sludge dehydrating devices J (preferably centrifuges) associated therewith. The house also contains a number of steam boilers K and the furnaces L associated therewith. The steam which is generated by the burning of the many products recovered by the plant, with or without additional fuel, is best used in a steam turbine M, driving a generator N for the production of usable and salable electricity.

The part marked O, within the house, represents an air compressor that supplies any air required for the submerged aeration of the sewage, as hereinafter explained. The part P represents a source of chlorine, also for use in the system. And the part Q may be taken as representing a control board for the government of the sludge discharging devices belonging to the various compartments of the tank.

The clearest idea of the shapes and depths of the different compartments will be gained from the cross sectional views Figs. 3 to 8.

Fig. 3 is a vertical section lengthwise of the incoming channel A and first preliminary settling compartment B. The sewage enters through a so-called grit chamber 2 and encounters a screen 3, which removes coarse floating material from the stream. The screen is of a novel self-clearing form better shown in Figs. 9 and 10. Briefly, a rapidly rotated shaft 3a carries a large number of spaced metal discs 3b, nearly submerged in the sewage stream. These are driven by a motor 3c and form a bar-screen and as they rotate lift the coarse material from the surface and centrifugally discharge it into the hood 4, where it falls upon a draining screen 5. From thence the material is taken to the furnace L to be burned. The closed hood 4 has an exhaust fan and stack 6 and men may work around it without annoyance, even when the incoming stream is heavily dosed with oil or chlorine. The grit that settles in the pocket 2 is extracted as it collects, for example by means of a plunger 37, and is also taken to the furnaces and there incinerated.

Leaving the screen, the somewhat refined sewage flows lengthwise in the first compartment B. Such movement has the effect of pushing the finer floating substances toward the far end of the compartment and at that point a floating skimmer 7 performs the function of lifting such substances from the surface and discharging them into a duct 8 that conducts them to a proper sump, preferably to the sump I. In this manner floating oils, greases and other scums are at once disposed of. They require little further attention, being completely removed from the main sewage stream. The detailed construction of the skimmer appears in Figs. 11, 12 and 12a and will be referred to later. If oils or greases predominate and are of value, they are separated after leaving the skimmer and only the residues are burned. The skimmers 7, 7a and 7b are best operated intermittently. Petroleum introduced at the coarse screen suppresses all sewage odors and persists in the channel C.

Although the sewage stream enters rapidly from the channel A, it quickly loses velocity in the extensive compartment B and in consequence the coarse solids settle rapidly therein. Having settled upon the trough-like bottom of the compartment the solids must be removed in order that the process may continue without interruption. To that end the trough is provided with a narrow flat bottom surface 12, which extends from end to end thereof, leading to a discharge opening 13 at one end. An inverted U-shaped rail 14 is normally held suspended above the narrow bottom 12. When the sludge is to be discharged the rail is lowered until it rests upon the flat bottom 12 and with one of its ends tightly closed against the end of the compartment which contains the discharge hole 13. That hole is normally closed by a valve 15; which is then opened.

The lowering of the rail obviously serves to entrap or enclose a quantity of sludge beneath the rail and when the valve 15 is opened the entrapped sludge is quickly discharged, lengthwise beneath the rail. The discharge is effected very positively, the duct formed by the inverted trough or rail being momentarily open and under the pressures of the head of water above it in the compartment.

The sludge discharging arrangement above described is employed at the bottom of each trough portion of the tank and being of much importance is fully detailed in Figs. 13 to 17, to which special reference will be made.

The discharged sludge enters a duct 16 by which it is conducted directly to the before mentioned separating tank or sump I. The sludge becomes compact when it settles in the bottom of the trough, but its discharge from the tank bottom is accompanied by some water and the function of separating the excess water is performed by gravity within the sump I. A dense sludge is removed from the bottom of the sump while the gravity separated water is "decanted" or pumped back into the channel A. The compact sludge is taken from the bottom of the sump I and sent to the furnaces. It may be further dehydrated in the centrifuges J, before being burned, as will be later explained.

Fig. 4, a vertical section crosswise of the tank, discloses the relations of the middle channel, the side channels E, E, and the intervening cross-flow tanks D.

The lengthwise flow of the sewage in the middle channel C affords opportunity for collecting residual oils and greases from the stream; hence another floating skimmer 7a is used at the closed end of the channel C, and the oils and greases lifted from that surface pass into the sump I through a duct 17; all as appears in Fig. 1.

Again referring to Fig. 4 it will be seen that the sewage leaves the channel C at the sides thereof and passing beneath the scum boards 18 encounters so-called mixing rotors 19, which are propelled by motors 20, as shown in Figs. 1 and 5. These parts of the structure are of special interest as they provide for another and most advantageous use of oil in the system. They will be described at greater length in connection with Figs. 18 to 21 inclusive.

By reference to both Figs. 1 and 4 it is to be seen that the volumetric size of each compartment D is large and such that the sewage must needs flow very slowly therein. Therefore both time and opportunity are afforded for an exceedingly effective gravity separation of the fine substances still persisting in the sewage. Some are lighter than water and collect upon the surface, slowly moving toward the outlet or channel E. Before reaching that point, the floating substances, chiefly oils, are intercepted by a surface outfall trough 21, and accompanied by a small quantity of water, such scums are discharged directly into the sump I through pipes 22 (see also Figs. 1, 2, 6, 7, 8, and 28).

In lieu of or in addition to the long skimming trough 21, the invention comprehends the use of a floating and automatic skimmer (see Fig. 12) between each channel E and the finishing compartment F. Such floating skimmer is positioned crosswise of the channel leading from compartment D. The arrangement is identical with Figs. 11 and 12 except that the water flows beneath the bottom of the floating boat and the wall to which the float is anchored extends only a short distance below the top surface of the liquid, only a shallow wall being required to stop the scum or oil sludge within reach of the skimming brush.

All substances heavier than water, settle upon the multiple trough bottom of the compartment D and are discharged by means of sludge rails 14, in the manner above described.

The purified water passes from the compartment D, preferably through a number of adjustable outfall control weirs 23 and enters the side channel E, thence to pass into the finishing compartments F.

Before discussing the finishing compartment, attention reverts to the elements which are marked 24 in Fig. 4. These comprise colloiders or agglutinators. They will be described in detail in connection with Figs. 22 to 27 inclusive. At the expense of little resistance to the flow of the sewage, they serve to collect and enmass the fine colloidal particles which resist gravity and persistently tend to remain in suspension in the liquid. These so-called colloiders 24 gather the very minute particles and forming them into masses, make them readily separable by gravity so that it is an easy matter to recover these substances along with the other sludges developed in the tank.

Fig. 5 identifies the channels C and E and is to be read with Figs. 3, 6, 7 and 8. Chiefly, Fig. 5 illustrates a short pipe tunnel 25 which extends from side to side of the plant, opening into the power house H. That tunnel most conveniently contains the sludge discharge ducts 16, the valves 15 belonging thereto and the devices which are employed to raise and lower the so-called sludge discharging rails 14. The manholes of vent stacks 25a, leading upward from the tunnel 25, most conveniently contain the driving motors 20 belonging to the before mentioned rotors 19. All parts are opening accessible within the tunnel. The parts associated with the sludge rail will be best understood upon reference to Figs. 13–17.

Fig. 6 is a vertical section at right angles to Figs. 3, 4, and 5. Three preliminary settling compartments B appear at the right hand and it will be noted that they are separated by vertical walls 26 which act as long weirs and ensure uniformity of distribution and flow. Undulatory movement of the current is occasioned by the presence of the vertical baffles b' and b'' shown adjacent the walls 26, and results in the rapid precipitation of the heavier sewage particles. Sedimentation is specially enhanced and made to occur within small space, by reason of the very slow movement of the liquid crosswise of the compartments B, occasioned by the distribution of the liquid over the wide-spreading weir walls 26.

Fig. 6 also serves to illustrate the extent of the colloiders 24 within each compartment D; and accurately depicts the position of the finishing compartments F. It also exhibits in cross section, the tunnel 25 and the mid-wall 27 which separates the compartments D, D.

Fig. 7, a sectional view in line with the middle or distributing channel C, shows the opening 28 through which the liquid leaves the last preliminary compartment B and enters the channel C. The location of the skimmer 7a at the closed end of the tunnel C is made clear; also the positions of the scum boards 18, before mentioned.

Fig. 8, a sectional view through one of the side channels E, shows the opening 29 leading into the first of the finishing compartments F. The narrow outfall distributing weirs 23 are also here identified.

The movement of the liquid lengthwise through the side channels E may be rapid but becomes very slow within the wide-spreading finishing compartments F, and thus time is allowed for a last sedimentation to take place. For that reason the bottom of each trough F is equipped with a sludge discharge rail 14.

Of much importance is a process of final aeration which is of such simplicity that it may be conducted in open compartments 30 formed by walls 31 that rise above the compartments F. Rotors 32 lift liquid from the surface in compartment F and throw it upward into the compartment 30, a fine spray being formed and ensuring intimate contact with oxygen affording air. In the main, the aerated water falls into the next compartment.

A mechanical advantage to be noted at this point is that as all the liquid is thrown upward the level in the next compartment may be thereby raised; and the outfall of this system may be actually higher than the inflow. This is important where the delivery of sewage is at a low level and it is desirable to avoid pumping.

As will be apparent, this is an aerial process of aeration or oxidation and it is to be contrasted with the submerged aeration that is practiced in older systems. Much less power is expended and better contact between water and air is ensured. The result here produced is an impregation of the water with oxygen so that when the purified water leaves this system it enters the diluting lake or river with an abundance of oxygen. In other words, the apparatus here depicted is an economical and sure means of supplying the "biochemical oxygen demand" of the effluent of the system and attains all of the long sought advantages pertaining to complete sanitation and the preservation of animal and vegetable life in the diluting waters. It is now possible to discharge effluents of even better quality than the water in the streams or lakes receiving them.

The water which is thus sprayed upward into the compartments 30 by the small but high speed rotors 32, contacts the rough walls of the compartments and natural vegetable growths building thereon have a well known purifying effect upon contacting the water.

Next, it is to be noted that the aerated water descends to the surface of the liquid in the compartments F in the form of small drops and streams. Any minute quantities of oil contained thereby being of less weight than the water are prevented from again entering into suspension or emulsion and immediately spread upon the surface. Such being the case, means are provided for removing the resulting film of oil. As a rule it will be sufficient to provide a single skimmer 7b for that purpose at the end of the last finishing compartment F. A pipe 33 leads from that skimmer to the sump I. Explanatory details of these finishing stages will be found in Fig. 28.

Mention has been made of the use of oil in this system and the means used for its introduction have been referred to as including the rotors 19 at the sides of the distributing channel C. It may at once be said that the system may be operated with or without using added oil. But I discovered that common mineral oils have a strong affinity for the lesser solids of sewage and that the use of oil affords benefits of such marked value as to make it evident that the oil should be incorporated in the process.

Further, as power is to be generated and as an ample production of power is desirable in almost every plant, it is believed to be most forunate that the fuel oil which is to be burned for the production of power may have a preliminary use and serve important offices in the treatment of the sewage, prior to the burning of the oil in the boiler furnaces.

Of like importance is the fact that such oils when spread upon the surface of the flowing sewage completely and positively suppress and neutralize all sewage odors; and this without any unpleasant odor of oil, for the ordinarily sharp odor of the oil is in turn pleasantly modified by contact with the gases, oils and greases of the sewage.

The process involves the intimate thorough brief admixture of sewage and oil. This is best accomplished by means of the many disks of the rotor 19, which cause close contact between the solids and the oil. The oil instantly accepts and retains the contacted solids through an affinity therefor. A body of oil is maintained in the presence of the rotor and the process is continuous. The befouled oil accumulates at the bottom of the maintained body and is continuously released and permitted to rise to the quiet surface of he liquid in the cross compartment D. It is then referred to as an oil sludge, containing much organic matter. The oil sludge covers the entire surface of the liquid in the compartment D and moving toward the discharge end thereof is continuously released or removed by the oil skimmer 21 (Figs. 1, 2, 4, and 28).

Any stray particles of oil that escape from the compartment D are finally separated in the finishing compartment F, through being sprayed upon the surface, as before described.

All of the skimmings from the several parts of the tank may be piped direct to the sump I as here shown. A dependable gravity separation occurs in the sump and the excess water is returned to the system as before explained.

As a rule, only the befouled oil will be taken from the sump and fed to the furnaces belonging to the boilers K. The gravity clarified oil from the upper part of the sump is best returned to the mixing rotor 19 for repeated use in the process. However, if required by the demand for power the whole quantity of oil may be burned as it comes from its first use in the sewage tank. The mechanical details attending the operation of this oil affinity process will be clearly understood upon reference to Figs. 18–21.

Consideration may now turn to several components of this system which are of marked importance. First to be considered is the assemblage of parallel troughs serving as settling compartments and designed to obviate short circuits and to furnish maximum sedimentation capacity within a minimum of area. Tanks of such construction may be extended without limit and at low cost, and require little attention. They are relatively shallow and are easily maintained. Such multiple trough tanks are adaptable to purification of liquids of all sorts and when equipped with the surface skimming and sludge discharging devices here described lend themselves to the economical recovery of both floating and settled substances. Such tanks are required by many industries and most communities.

Figs. 9 and 10 illustrate the stream screening mechanism of this system—a self-cleaning screen of special utility. Rotation of this multiple disc rotor 3 is indicated by a direction arrow in Fig. 9. The greater part of the water passes between the partially submerged discs composing the rotor, just as it would pass through a bar-screen, but the discs may be closer together. Floating objects driven against the periphery of this rotating screen by the flow pressure of the liquid are instantly raised from the stream and are thrown off centrifugally at the top of the rotor. A top direction board 3d, somewhat like a scraping blade, may assist delivery. Thus delivered to the traveling screen 5 which forms the bottom of the hood 4, the coarse materials are carried through an opening in one side of the hood 4 and are dumped upon the under-lying pile 34 thence to be removed to the furnaces. The traveling screen is in the form of an endless belt which is driven by a motor 35 and encircles the short trough section 36 of the channel A. Because of the relatively small cross section of the channel, the belt is of no great length, and is easily maintained.

While this screening rotor may be used in a shallow channel it is best to place it at the outlet of a deeper grit collecting pocket 2. A power operated plunger 37 may be used for extracting the grit from the bottom of the grit chamber. Such plunger serves to discharge the grit through a pressure balancing riser or duct and thus delivers the grit to the pile 38; from whence it is taken to the furnace for incineration, or otherwise disposed of.

Figs. 11, 12 and 12a depict the preferred form of the floating skimmer before referred to. It will be seen to comprise a small boat 39 which is attached to the end wall or end baffle of the compartment by pivotal links 40 so that the boat is free to rise and fall with the level of the liquid in the compartment. The boat carries a surface sweeping rotor, preferably a rotary brush 41 like unto a street sweeper brush. The boat and its rotor extend substantially from side to side of the compartment and the rotor is operated by the motor 42 which is carried by the boat. The bottom of the rotor or brush dips slightly into the scum coated surface of the liquid and the rotation of the brush operates to throw the floating substances and a small quantity of water upward within the enclosing scroll 43, and thence into the elevated discharge trough 44. The device is truly automatic, is self-cleaning, and requires a minimum of attention. As before explained, the liquid falls from the trough and flows to the sump I, by gravity.

Figs. 13–17 accurately present the details of the preferred construction of the before mentioned sludge discharging rail. That mechanism has a wide range of uses in the evacuation or discharge of settled sludges. The before mentioned narrow flat bottom of the trough is formed by an inverted metal channel 12 and at one end thereof appears the sludge discharge hole 13, to which the drain valve 15 belongs. The discharge rail 14 is here clearly shown to be of the inverted trough or U-shape before defined. It presents a sharply pitched top so that no sludge may lodge thereon. When the rail is lowered its bottom edges rest firmly upon the flat member 12 making sufficiently tight joints therewith. At such times one end of the groove or conduit within the rail registers with and closely joins the discharge hole 13 at the end of the trough. The other end of the rail is spaced away from the opposite wall of the trough and therefore that distant end of the rail is open for the reception of further sludge and water from the trough.

The lowered rail encloses a quantity of sludge, trapping the same within and between the rail and the bottom 12. The discharge of the trapped sludge is accomplished by opening the valve 15, whereupon the sludge is pushed lengthwise beneath the rail by the pressure of the water seeking to reach the open valve 15; much as shot is expelled from a gun barrel. Minor leaks beneath the edges of the rail aid discharge by stirring the sludge resting on the flat bottom 12. The rail, made in convenient spliced sections, may be more than one hundred feet long and yet the discharge of the sludge is so positive and rapid that the valve need remain open only a few seconds. It is then closed to prevent loss of water; an excess would merely dilute the sludge in the sump I. The small vents 14x in the top of the rail are useful at the time the rail is lowered. By permitting a relief of pressure beneath the rail these openings allow the rail to be lowered quite quickly without expelling the sludge either sidewise or endwise, which would defeat the entrapment of the sludge. The same result may be attained by lowering the rail more slowly.

Upon the closing of the valve 15 the rail 14 is at once lifted to the position shown by dotted lines 14a in Figs. 13 and 17. To enable such action, the rail is mounted upon parallel motion links 45 fulcrumed in blocks 46 projecting upward from the channel member 12. Several counter-balancing links 47 may be used with adjustable weights 48, and these make the operation of the rail easy. Endwise movement is imparted to the rail in first one and then the other direction, by means of a small reciprocating engine 49 (cylinder and piston) which is positioned in the wall of the tank and connected to the rail through the medium of the link 50 and an operating arm 51.

The engine is actuated by compressed air, or by water pressure, and is thus adapted for remote control, the control valves thereof being operated from the before mentioned control board Q in the power house. The control may be either automatic or manual.

The last part of the movement of the engine piston 49a and piston rod 49b in the direction which lowers the rail, comprises "lost motion" (permitted by slot 50a in link 50) which allows the rail to close down upon the bottom 12 before the engine piston finishes its travel. The lost motion portion of that travel is then used to open the valve 15 through the medium of the pivoted lever 52, the opening of the valve occurring only after the rail is seated upon the bottom of the trough. Reversely, the valve 15 is released and closes before the rail is raised.

A detail of mechanical importance comprises the single casting 53 which contains both the housing 13a of the valve 15 and the cylinder portion of the engine 49. This casting is set directly in the concrete, and becomes a permanent part; yet it will be noticed that all parts are left accessible for purposes of inspection and repair by men working in the adjoining compartment and the tunnel 25. The form of the casting 53 is only slightly modified when the tank is made of metal plates instead of concrete.

By preference the rail is a metal casting. Counter-balanced as here shown, the rail may be a thin walled iron casting and it is obvious that metal alloys of less weight and of the order of aluminum may be substituted. While the cast metal rail is preferred, it is to be understood that the invention also comprehends sludge rails that are made of sheet and wrought metal.

It will be noted that the parallel links 45 are installed in pairs (see Figs. 15, 16, 17) and that each pair is joined to the rail by a cross pin 45' that extends through or is secured in transverse lugs 14y which are provided on the rail 14. Certain of the links 45 arranged in pairs are best integrally united with the associated lever arms 47 and 51, before described.

Special attention is called to the shapes of the blocks 46 in which the lower ends of the links 45 are formed. By preference these blocks are merely notched to receive the fulcrum pins 45" of said links. Such construction facilitates the installation of the sludge rail and likewise makes the removal thereof easy of accomplishment.

The action of the sludge rail with respect to the settled sludge is made clear by comparison in Figs. 18 and 28, wherein the rails are shown in the raised and lowered positions described.

Figs. 18 to 21 may now be referred to in further explanation of the uses of oil, chlorine and compressed air. These drawings are enlargements made from Figs. 1 and 4. The scum plate 18 and the multiple disc rotor 19 have already been pointed out as positioned at the top of the weir wall 54 between the mid-channel C and the larger compartment D. As shown each board or plate 18 is adjustable and may be used as a closure to stop the flow of liquid to the rotor and compartment D.

The first division of the compartment D is distinguished by a floor portion 55, leading to the first sludge trough 56 of the compartment D. Short division walls 57 join the walls 54 and 55 and serve to support the baffle plates 58, 59 and 60 and the latter form the spaces 61, 62 and 63 in which the before mentioned body of oil is trapped, as about to be explained. But first the rotor is to be examined.

The top of the wall 54 carries a number of spaced bearings 64 and the rotor, which later extends from side to side of the broad compartment D, is divided into convenient sections having end shafts 19a which interlock within the bearings 64. As well shown in Fig. 21 the shaft ends 19a form a dental clutch 19b which interlocks one with the other; so that the series of sections may be driven by a motor 20 at one end of the long rotor 19, as indicated in Figs. 1 and 5. Each section of the rotor 19 comprises a tubular shaft 65 and a large number of spaced discs 66 which are mounted thereon and fastened by a central clamping bolt 67. The shaft 65 is itself engaged and finished by the hub sections 66a which possess the shaft parts 19a.

A supply of oil is received from a distributing pipe 68 and the oil rests upon the water and is trapped between the plates 18 and 60. Being of less weight than the water, its surface 69 is always above the level 70 of the sewage in the channel C, but the latter is always slightly higher than the liquid level 71 maintained in the slow motion compartment D. Therefore, a constant flow of sewage is maintained through the space 61 and downward against and across the floor 55.

The rotor is assumed to be in rotation in the direction of the arrow 72 in Fig. 18, and normally the rotor is completely submerged in the trapped oil. This is another way of saying that the extensive surfaces of the rotating discs 66 are continuously coated with oil. When the underside of each disc moves toward the baffle 18, it encounters the upward moving stream of sewage behind the baffle 18. In addition to the agitation produced by the rotor, very intimate contact between the oil and the sewage solids is occasioned by the displacement of the films of oil on the discs by the water; which replaces the oil by reason of the higher "surface tension" of the water. In effect, films of oil collecting on the rotating discs are thus detached and caused to close in upon the intervening films of water and thus the solids are forced into intimate contact with the oil, following which the solids are retained by the oil while the water passes downward into the larger compartment.

A mixed stream of oil and water, of little depth but of the full length of the rotor, is swept upward and over the rotor and is discharged into the major body of oil present in the space 61. There the oil and water separate by gravity, the water falling through the large opening 73 between the wall 54 and the lower edge of the inclined baffle 58. Meeting the floor 55, the water is deflected and passes beneath the lower edge of the baffle 60, entering the body of the compartment D about on a level with the tops of the sludge troughs and well below the surface 71.

The solids grasped by the oil sink naturally into the lower part of the oil body. As the befouled oil accumulates it escapes beneath the lower edge of the inclined baffle 58 and thereupon rises into the quieter separating space 62. The floating body in that space is limited only by the depth of the baffle 59 and as the befouled oil accumulates it is permitted to escape upward through the narrow space 63 between the baffles 59 and 60, thus reaching the surface 71. Meantime, the oil which is clarified by gravity separation within the space 62 passes back into the top of the space 61 to be re-used by the rotor; the two spaces being in communication across the upper edge of the inclined baffle 58. The oil body is replenished through the supply pipe 68 as rapidly as befouled oil leaves the trap through the space 63.

The oil mixing parts here described are self-cleaning and need no attention whatever other than occasional examination of the rotor bearings.

Before leaving the subject of the oil treatment of the sewage, attention is called to the fact that all sewage, oils and greases are freely miscible with the mineral oil here employed. For example, any floating residues which reach the rotor 19 are mixed with the oil and are thus promptly incorporated with the larger body of oil floating within the separating trap defined by the wall 54 and the baffle plates or walls 58, 59 and 60.

Commercial petroleum, of grades no better than crude kerosene, admirably serves the purposes of this invention and obviously may be burned freely with all the impurities which the oil takes up while in the treating tank.

Two ducts, marked 74 and 75, (see Fig. 18) will be noticed beneath the floor portion 55. The tops of these ducts are formed by porous brick 76, placed in the floor 55. One channel is devoted to supplying compressed air while the other is reserved for the introduction of chlorine.

By means of such foraminous or perforated duct air is projected into the liquid sweeping forward across the floor 55 and such air ascends therein in the form of minute bubbles. It is employed for its aeration value and as an aid in the levitation of any oil particles found in the moving sewage. The air bubbles assist the oil attached solids to rise to the surface promptly. Little air is required for these purposes and as it is released only a few feet beneath the surface of the liquid little power is consumed in the delivery thereof as here required. The delivery of liquid chlorine to the partially purified sewage is similarly accomplished by way of the submerged duct, the chlorine being released from the tanks P located in the power house.

As is well known chlorine exercises a beneficial effect and, as proved by others, if used generously may be depended upon to actually sterilize both the water and the settled sludges. Further when used in sufficient quantity it acts to shrink the flocculent solids, an advantage to sedimentation and in the final treatment of the sludge.

Figs. 22–27 are devoted to the "colloider" previously identified as the part marked 24 in Figs. 1, 4 and 6. The colloider extends from side to side of the compartment D and is made up of a succession of pivoted frames; a shutter-like arrangement. Each frame 77 has a vertical shaft 78 and the ends of all the shafts are held top and bottom by the bars 79 and 80. Parallel motion bars 81 and 82 connect alternate frames and by means of a lever 83 the frames may be partially rotated or alternated in position, as will be apparent upon contrasting Figs. 24 and 25. In this way the frames may be reversed with respect to the flow of the sewage stream.

The frames 77 preferably extend above the liquid surface 71 and they contain fine wire screens 84. Screening of about one-fourth inch mesh is best employed but finer meshes may be used. The combined free area is so great that little if any opposition is offered to the flow of the water. This resistance is slightly increased when the screens become coated, but occasional reversal of the shutter-like screens serves to clean them.

Attention is called to the shape of the cross or foot bar 80 (Fig. 23) and it will be noted that the bar is preferably in the form of a broad plate which, being close to the lower ends of the swinging frames 77, closes the V-shaped openings which would otherwise be left at the bottom of the colloider. It is desirable to prevent the short circuiting of the liquid for all of the liquid should pass through the matted frames of the colloider.

Assuming the screens to be positioned as in Figs. 24 or 25, it will be apparent that they present a very extended screen surface to the flowing liquid. They provide a wide spreading foundation or comb upon which the solids and colloidal matters collect. In this way the screens are covered with a porous mat. The mat builds against the up-stream face of the screen and also forms as a stringy mass upon the downstream side thereof. In consequence of the maintenance of such masses or mats even the finest colloids are caught and a marked improvement is effected in the clarity of the sewage passing to the finishing and aerating compartments of the system.

The mats which grow upon the screens are so porous that they continue for long periods without materially opposing the flow. Meantime, the massed substances occasionally sluff off and sink into the sludge troughs, to be removed with the sludge. When oil sludges are thus collected and sluffed, they rise to the surface 71. Where the oil and the colloid collecting screens are both used, as here shown, it is admissible to arrange the oil-sludge skimmer 21 in advance of the colloider.

When the screens are seen to be too heavily loaded it is only necessary to reverse them by means of the lever 83, and thereupon the flowing water detaches much of the load and conditions the screens for further use.

This simple and inexpensive colloider is of special utility and it may be employed profitably in liquid purifying systems of many types.

Little need be added concerning the form and work of the finishing compartments F shown in Fig. 28 upon an enlarged scale. That drawing, however, discloses the baffle or division plates 85 which rise behind each rotor, preventing direct communication between the compartments. This drawing also shows the depending baffle 86 which hangs within the middle compartment F, to enforce downward flow of the sewage from rotor to rotor. Fig. 28 very clearly shows how the water level is raised in the compartments F when it is necessary that the working level of the outfall G shall be higher than that in the influent channel A.

Fig. 29 is to be read in conjunction with Figs. 1 and 2 and on a larger scale depicts the sump which receives all of the sludges from the main tank or system and within which the essential separations of sludges and water are accomplished.

By preference, the sump is a concrete well of considerable depth. It has a hopper bottom 84 which facilitates the withdrawal of the settled sludge through a lift pipe 88, thence to pass to the furnaces. The top of the sump rises to the level of the top of the main tank, so that it cannot be flooded or overflow in case of inattention.

The pipe 89 may be taken as the terminus of all the pipes 16 which lead from the sludge valves at the bottoms of the tank compartments. Next, the upper pipe, 90, may be taken as the terminus of all the skimming pipes and ducts which receive foul oils and greases from the surface of the sewage. A valved pipe 91 leads from an intermediate point in the sump and is connected to a pump by which the excess water received with the sludge is decanted and is returned to the influent channel A of the system. The gravity delivery of the sludges to the sump comprises a feature of much value.

It will be noticed that the level in the sump is controlled by the rate of liquid withdrawal. That level is kept lower than the liquid level in the main system and the difference of levels supplies the "head" or force which is required for the discharge of sludges from the bottoms of the tank compartments.

Most advantageously, a cylindrical wall 92 in the top of the sump divides that part into a bottomless chamber 93 and a surrounding bottomless collecting chamber 94. A pump suction pipe 95 leads from the upper part of the chamber 93, and is used for draining off the clarified oil. Gas off-takes or vents 96 are provided in the top of the sump. The valved pipe 97 leads from the lower part of the annular chamber 94 for draining off the foul oil.

The oil sludges which enter the chamber 93 are promptly separated by gravity and the clear oil rises to the top, for return to the system through the pipe 95, or to be otherwise disposed of. The befouled oil collects at the bottom of the oil body and gradually accumulating in the surrounding chamber 94 is withdrawn and sent to the furnaces through the pipe 97. The operation conducted in the sump or separator is continuous and proceeds under the control of the pumps which withdraw the excess water and the two kinds of sludge.

The settlement of the watery sludges is conducted beneath the thick layer of oil which is maintained in the top chambers 93 and 94 of the sump or separator. The presence of that oil produces two important results. First, oxygen is excluded from the sludge, and second, all gases and vapors which rise from the decomposing sludge are promptly absorbed by the oil and no disagreeable odors rise from this sump. This makes it possible to locate the sump as here shown; that is, close to the main tank and beneath the roof of the power house. Much piping and power are thereby saved.

It has been proved that the thick sludge obtainable from the bottom of the described sump may be successfully and rapidly disposed of in the furnace and furnishes considerable heat. It is best, however, that the oil sludge shall be simultaneously burned, for it affords very high furnace temperatures and provides a sure source of power. One important effect of the high temperatures is to completely consume all noxious vapors and thus the operation is made completely odorless.

Bottom sludges contain a needless amount of water and to avoid its evaporation in the furnace chamber it is preferred to employ the centrifugal sludge driers marked J in Fig. 1. These are now available in compact and economical form and are capable of concentrating sludge continuously; discharging the materially dried sludge toward the furnaces and returning the separated water to the system. The burning of the sludge is thereby simplified.

The water supply systems of cities offer a distinct field for settling tanks and colloid collectors of the types here represented. No oil need be used in such systems, but otherwise the plants may be closely similar to that which is here depicted.

Requisite size or capacity is secured by mere multiplication of the number of tank compartments. No parts of new design are required.

The clarification of industrial wastes offers a large and varied field for the use of the described system, which possesses all the flexibility needed to meet any condition encountered.

To those who are skilled in the art, it will at once be evident that the mechanical structures as here discussed are subject to easy modification, and it is to be understood that such modifications are comprehended by the invention; all as made clear by the terms and scope of the appended claims.

I claim:

1. For operation upon flowing liquids that contain organic impurities, a purifying and waste recovery system comprising a sedimentation tank preceded by a refuse screen, in combination with means spreading mineral oil upon and thus modifying the odor and absorbing miscible substances from the liquid, oxygenating means operating upon the liquid in advance of the outlet of the tank, means for removing oily scum and bottom sludge from said tank, and, means for burning and utilizing the heat of the matters removed from the liquid.

2. For operation upon flowing liquids that contain organic impurities, a purifying and waste recovery system comprising a sedimentation tank, in combination with means spreading mineral oil upon and thus modifying the odor and absorbing miscible constituents from the liquid, a separating sump, a furnace and heat utilizing adjuncts adjacent said tank, means operable to remove oily scum from said tank and discharge it into said sump, means for decanting excess liquid from the sump, and, means for transferring foul oil from said sump to said furnace.

3. For operation upon flowing liquids that contain organic impurities, a purifying and waste recovery system comprising a longitudinally extended sedimentation tank, in combination with means for maintaining a flow of such liquid therethrough, means for continuously spreading mineral oil upon the surface of such stream and thus modifying its odor, means for continuously removing oily scum from said surface of the liquid in advance of the outlet of said tank and said outlet being below said surface.

4. For operation upon flowing liquids that contain organic impurities, a purifying and waste recovery system comprising a sedimentation tank preceded by a refuse screen, in combination with oxygenating means operating upon the liquid in advance of the outlet of the tank, a colloid barrier intermediately positioned within said tank, a separating sump, a furnace and heat utilizing adjuncts adjacent said tank, means operable to remove scum from said tank and discharge it into said sump, means operable to discharge bottom sludge from the tank and into the sump, means for decanting excess liquid from the sump, and, means for transferring scum and bottom sludge from said sump to said furnace.

5. For operation upon flowing liquids that contain organic impurities, a purifying and waste recovery system comprising an elongated sedimentation tank made up of entrance and exit compartments, in combinaiton with oxygenating means positioned between the tops of said compartments and forming the outlet of the entrance compartment, said oxygenating means positioned and adapted to take liquid from the upper part of the entrance compartment and throw it into the air above and into said exit compartment.

6. The herein described system component, comprising an elongated sedimentation compartment having one of its side walls formed by a weir of substantially its own length, in combination with a scum board adjacent said weir, a liquid inlet channel at one end of said compartment and a scum skimmer at the other end thereof.

7. The herein described system component, comprising parallel sedimentation compartments, in combination with influent and effluent compartments at the ends thereof, a tunnel extending across the bottoms of said compartments, and, mechanism in said tunnel providing for and controlling the discharge of sludge from the bottoms of said compartments.

8. The herein described system component, comprising a liquid channel, in combination with a shaft extending across said channel beneath the liquid level therein, a plurality of discs mounted upon said shaft and closely spaced from side to side of said channel, said discs extending above and below the liquid level and forming a liquid screen, means for rotating said screen to centrifugally discharge refuse intercepted thereby, and means above said liquid level, for the reception of the refuse.

9. The herein described sewage system component, comprising a liquid channel in combination with a plurality of closely spaced and coaxial rotary discs occupying said channel and extending both above and below the liquid level therein, forming a screen through which the liquid must pass, means for rotating said screen to centrifugally discharge and elevate refuse intercepted thereby, and a traveling transverse screen operating above said discs for the reception and discharge of the refuse from such screen.

10. The herein described system component, comprising a boat, in combination with anchoring means which permit the boat to rise and fall with the level of the liquid wherein it rests, a rotor, scroll and elevated trough mounted on said boat, the bottom of said rotor being positioned for slight submergence in the liquid and thus adapted to lift and discharge scum into said trough, and, rotor driving means also mounted on said boat.

11. The herein described system component, comprising a sedimentation compartment having a longitudinally extended floor and having a sludge discharge hole at one end of said floor, in combination with an inverted U-shaped rail adapted to rest on said floor with one of its ends in communication with said hole, means for opening said hole when the rail is so positioned, and means for closing said hole and raising and holding said rail suspended above said floor.

12. The component as claimed in claim 11, characterized by a plurality of parallel motion links operatively joining said rail and floor.

13. The component as claimed in claim 11, characterized by a rail operating engine mounted in the end of said compartment.

14. The component as claimed in claim 11, characterized by a valve controlling the sludge discharge hole and by a fluid pressure engine adapted to open said valve and having a lost-motion connection with said rail; whereby the opening of the valve is delayed until the rail is seated upon said floor and the closing of the valve is made to precede the raising of the rail from the floor.

15. The herein described system component, comprising a sedimentation compartment and a weir wall providing the entrance thereof, in combination with a scum board adjacent said wall and completing said entrance, an oil mixing rotor revolvable at the top of said wall, and, an open bottomed oil-body trap provided in the upper part of said compartment at the delivery side of said rotor.

16. The component as claimed in claim 15, characterized by an inclined baffle paralleling said rotor and positioned to be submerged in the oil body.

17. The herein described system component, comprising a sedimentation compartment and a weir wall providing the entrance thereof, a substantially level floor section adjacent said wall, a baffle above said section and paralleling said wall, and a sludge collecting bottom for said compartment below the level of said floor section.

18. The component as claimed in claim 17, and characterized by a foraminous fluid supply channel in said floor section, and paralleling said wall and baffle.

19. In a sequential system of liquid purification, a longitudinally extended passage for the stream of liquid to be purified, and means for continuously supplying thereto liquid that has been substantially freed of settleable solids, in combination with a colloid barrier positioned in a down-stream portion of said passage and extending from side to side and top to bottom thereof, said barrier being adapted to permit the passage of the liquid but providing an attachment or foundation for colloidal particles contained by the liquid and with said particles forming a filtering mass or mat by which the liquid is filtered with slight loss of hydraulic head, means for the interception and removal of colloid masses detached from said colloider.

20. The component as claimed in claim 19, characterized by a colloid screen composed of vertically trunnioned reversible sections.

21. The component as claimed in claim 19, and characterized by a colloid screen composed of angularly related sections positioned edge to edge, wherein and whereby the free area of the screen is enlarged with respect to the restricted cross-sectional area of the compartment.

22. For operation upon flowing liquids that contain organic impurities, a purifying and waste recovery system comprising a sedimentation tank preceded by a refuse screen, in combination with oxygenating means operating upon the liquid in advance of the outlet of the tank, a colloid barrier intermediately positioned within the tank, means for removing floating scum and bottom sludge from said tank, and, means for burning and utilizing the heat of the matters removed from the liquid.

23. For operation upon flowing liquids that contain organic impurities, a purifying and waste recovery system comprising a sedimentation tank, in combination with a separating sump, a furnace and heat utilizing adjuncts adjacent said tank, means operable to remove floating scum from said tank and discharge it into said sump, means for decanting excess liquid from the sump, and, means for transferring scum from said sump to said furnace.

24. For operation upon flowing liquids that contain organic impurities, a purifying and waste recovery system comprising a sedimentation tank preceded by a refuse screen, in combination with oxygenating means operating upon the liquid in advance of the outlet of the tank, an oil and liquid separating sump, a furnace and heat utilizing adjuncts adjacent said tank, means operable to remove floating scum from said tank and discharge it into said sump, means operable to discharge bottom sludge from the tank and into said sump, means for decanting excess liquid from the sump, and, means for transferring scum and bottom sludge from said sump to said furnace.

25. For operation upon flowing liquids that contain organic impurities, a sedimentation tank having an inlet at one end and an outlet at the other, in combination with an open bottomed aerating chamber superposed transversely upon the outlet end of said tank and rising above the same, a liquid elevating rotor extending crosswise of the liquid flow in the upper part of the tank and below said chamber, said rotor being adapted to throw or spray the liquid from the tank upward into said aerating chamber, the tank receiving the return of the liquid through the open bottom of said chamber.

26. The herein described system component comprising a longitudinally extensive sedimentation tank provided with an inlet in one of its ends and having a low side wall which serves as a discharge weir, a similarly extensive baffle paralleling said weir and extending both above and below the same, said baffle being pivotally supported and being movable to close the passage over said weir.

27. The herein described process of oxygenating treated liquid, which consists in momentarily trapping and holding the liquid between closely and partly submerged spaced discs and rotating said discs at a speed which not only causes them to slightly elevate the liquid into the air but also causes them to centrifugally discharge the liquid in the form of spray, the discharge being in the nature of a trajectory and thus accomplished by the expenditure of only so much energy as is required to tensionally disengage the liquid from the discs.

28. A purifying system comprising means positioned to accept the influent stream and adapted to mix a mineral oil therewith, in combination with means of directing the mineral oil thereto, a separating passage positioned to receive the mixture and having a purified stream outlet, separately associated means respectively adapted to temporarily retain the floating and sinking sludges, transfer means for both, an intercommunicating separator positioned to receive said floating sludge, and having a pocket for the reception of the sinking sludge.

29. A purifying system comprising means positioned to accept the influent liquid and convert the same into a broad, shallow stream, in combination with means of intimately admixing another liquid with said stream, a relatively deep separating passage positioned to receive the mixture and having a correspondingly broad purified stream outlet, associated means adapted to temporarily retain the resultant sludge within said passage and, means adapted to exhaust sludge therefrom.

30. The herein described mixer for purifying systems, comprising a liquid weir and spaced shaft bearings, in combination with a central member between each pair of bearings, a series of closely spaced discs fixed upon each said member and interconnecting shafts for said members, said shafts occupying respective bearings.

31. A purifying system comprising an influent sewage stream passage, in combination with an oil and sewage mixer positioned therein, a separating passage positioned to receive the product of said mixer, means for supplying oil to said mixer and circulatory means adapted to supply oil to said stream and mixed, connected with said separating passage.

32. A source of sewage which is substantially free of settleable solids and means for forming such sewage into a slowly moving stream, in combination with a foraminous metal barrier across said stream and through which the sewage is compelled to slowly move, the openings in said barrier being much larger than the particles contained in said stream so that the barrier does not operate as a screen but does operate as a foundation for matters in a colloidal state, whereby a colloidal filter mat is maintained across said stream.

33. A sedimentation tank having a trough-like bottom, in combination with a vertically movable rail of inverted U-shape and nearly as long as said trough, said rail being adapted to be lowered into contact with the trough, means for lowering the rail to temporarily trap sludge between the same and the bottom of the trough and means for opening one end of the closed passage thus formed, to discharge sludge from said passage.

34. A sedimentation tank having a trough-like bottom, in combination with a vertically movable rail of inverted U-shape and having a V-shaped top and nearly as long as said trough, said rail being adapted to be lowered into contact with the trough, means for lowering the rail to temporarily trap sludge between the same and the bottom of the trough and means for opening one end of the closed passage thus formed, to discharge sludge from said passage.

35. A skimmer comprising a scroll presenting a substantially horizontal lower inlet floor part, in combination with a float on which said scroll rests, a rotary element positioned in said scroll to discharge liquid received upon said floor part, and means for driving said rotary element.

36. The method of treating sewage which comprises flowing sewage, including liquid and solid matter, through a tank at a rate such that solid matter in the sewage will settle out, arresting the flow of the sewage and while the flow is arrested discharging supernatant liquid sewage from the tank over the arresting means through the air in the form of a spray.

CHARLES GILBERT HAWLEY.